US008360864B2

(12) United States Patent
Dickerson

(10) Patent No.: US 8,360,864 B2
(45) Date of Patent: Jan. 29, 2013

(54) SYSTEMS AND METHOD FOR SHARED WIN AWARDS DISTRIBUTED BASED ON SHARING PERCENTAGES AMONGST ELIGIBLE PLAYERS

(75) Inventor: Scott Dickerson, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 215 days.

(21) Appl. No.: 12/875,802

(22) Filed: Sep. 3, 2010

(65) Prior Publication Data

US 2010/0331076 A1 Dec. 30, 2010

Related U.S. Application Data

(63) Continuation of application No. 11/530,168, filed on Sep. 8, 2006, now abandoned.

(60) Provisional application No. 60/715,027, filed on Sep. 8, 2005.

(51) Int. Cl.
*A63F 9/24* (2006.01)
*A63F 13/00* (2006.01)

(52) U.S. Cl. ............................... 463/25; 463/16; 463/20

(58) Field of Classification Search .............. 463/16–20, 463/25–29; 273/138.1, 139
See application file for complete search history.

(56) References Cited

U.S. PATENT DOCUMENTS

| | | | | | |
|---|---|---|---|---|---|
| 5,564,700 | A | * | 10/1996 | Celona | 463/27 |
| 5,639,088 | A | * | 6/1997 | Schneider et al. | 273/138.2 |
| 5,836,817 | A | * | 11/1998 | Acres et al. | 463/26 |
| 6,077,162 | A | * | 6/2000 | Weiss | 463/26 |
| 6,089,980 | A | * | 7/2000 | Gauselmann | 463/27 |
| 6,142,872 | A | * | 11/2000 | Walker et al. | 463/16 |
| 6,146,273 | A | * | 11/2000 | Olsen | 463/27 |
| 6,206,782 | B1 | * | 3/2001 | Walker et al. | 463/25 |
| 6,312,332 | B1 | * | 11/2001 | Walker et al. | 463/23 |
| 6,358,149 | B1 | * | 3/2002 | Schneider et al. | 463/27 |
| 6,416,409 | B1 | * | 7/2002 | Jordan | 463/27 |
| 6,554,705 | B1 | * | 4/2003 | Cumbers | 463/29 |
| 6,565,434 | B1 | * | 5/2003 | Acres | 463/25 |
| 6,786,824 | B2 | * | 9/2004 | Cannon | 463/42 |
| 6,869,361 | B2 | * | 3/2005 | Sharpless et al. | 463/25 |
| 6,887,154 | B1 | * | 5/2005 | Luciano et al. | 463/26 |
| 7,037,195 | B2 | * | 5/2006 | Schneider et al. | 463/25 |
| 7,048,628 | B2 | * | 5/2006 | Schneider | 463/16 |
| 7,351,140 | B2 | * | 4/2008 | Wolf et al. | 463/16 |
| 2002/0177483 | A1 | * | 11/2002 | Cannon | 463/42 |

(Continued)

OTHER PUBLICATIONS

International Search Report corresponding to International Application No. PCT/US2006/035220 (WO2007/030801A3, mailed Mar. 14, 2008, publication date Apr. 16, 2009.

(Continued)

*Primary Examiner* — Milap Shah
(74) *Attorney, Agent, or Firm* — McAndrews, Held & Malloy, Ltd.

(57) ABSTRACT

Certain embodiments provide a system and method for providing shared wins in a gaming system. Certain embodiments include establishing a shared win award, wherein the shared win award has an amount or value. One or more eligible players may be identified to participate in a shared win, wherein eligibility of a player is independent of player choice. A shared win event may be determined and at least a portion of the shared win award may be awarded to each of the one or more eligible players. At least one group of players may be defined as eligible to participate in a shared win. A sharing percentage of the shared win award may be assigned to each of the eligible players as a function of relative play among the eligible players. The sharing percentage assigned to a player may be adjusted based on play relative to other eligible players, for example.

30 Claims, 4 Drawing Sheets

U.S. PATENT DOCUMENTS

| | | | | |
|---|---|---|---|---|
| 2003/0036430 | A1 * | 2/2003 | Cannon | 463/42 |
| 2003/0100361 | A1 * | 5/2003 | Sharpless et al. | 463/25 |
| 2003/0104853 | A1 * | 6/2003 | Tessmer et al. | 463/16 |
| 2003/0109304 | A1 * | 6/2003 | Gauselmann | 463/30 |
| 2003/0119576 | A1 * | 6/2003 | McClintic et al. | 463/20 |
| 2003/0148804 | A1 * | 8/2003 | Ikeya et al. | 463/16 |
| 2003/0186733 | A1 * | 10/2003 | Wolf et al. | 463/16 |
| 2005/0164768 | A1 * | 7/2005 | Wright | 463/17 |
| 2006/0046823 | A1 * | 3/2006 | Kaminkow et al. | 463/16 |
| 2006/0217170 | A1 * | 9/2006 | Roireau | 463/16 |

OTHER PUBLICATIONS

International Preliminary Report on Patentability and Written Opinion of the International Search Authority corresponding to International Application No. PCT/US2006/035220, Mar. 10, 2009.

* cited by examiner

SYSTEMS AND METHOD FOR SHARED WIN AWARDS DISTRIBUTED BASED ON SHARING PERCENTAGES AMONGST ELIGIBLE PLAYERS

RELATED APPLICATIONS

This application claims priority to, and is a continuation of, co-pending U.S. application Ser. No. 11/530,168, filed Sep. 8, 2006, which is incorporated herein by reference, and which claims priority to U.S. Provisional Patent Application No. 60/715,027, filed Sep. 8, 2005, which is also incorporated herein by reference in its entirety.

BACKGROUND OF THE INVENTION

This invention relates to gaining systems, and more particularly relates to providing shared win games to patrons in a gaming establishment.

Gaining machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments. Thus, competition between manufacturers of gaming machines has intensified as competitors vie for business from gaming establishments.

A large gaming casino typically employs thousands of gaming machines that can be operated simultaneously. These gaming machines can be used to simultaneously play multiple games using multiple rewards. A gaming system providing entertaining and enticing features for players would be highly desirable to attract both new and returning players to a gaming establishment. Additionally, a gaming system that allows customization and dynamic modification by an operator would be highly desirable to provide new features to customers. Current gaming machines are difficult to reconfigure and offer the same game to multiple users at multiple gaming establishments. Certain games may become old or unattractive to players and need updating or replacing.

At certain times, game play in casinos is historically slow, and, at certain times, game play in casinos is busy. However, even at busy times, a level of excitement in a casino may not be as high as it could be. Thus, a system and method that enable a casino to provide a game play incentive during both slow times and busy times would be highly desirable. A system and method that enable a casino to generate both player excitement and handle would be highly desirable.

One method used to provide increased excitement in a casino is a progressive jackpot system wherein the progressive prize is shared among eligible players. Players become eligible by placing a maximum bet at a gaming machine and initiating play at the gaming machine within a certain time before the progressive jackpot is won. The amount of a player's bet and the time interval between a player's bet and the award of the jackpot is used to determine a player's eligibility to share in the progressive prize. U.S. Pat. No. 5,564,700 is an example of such a prior art shared progressive jackpot system.

Additionally, some casinos offer a "Bad Beat" jackpot that may be paid to multiple casino patrons when a "Bad Beat" occurs. A "Bad Beat" is defined as one player with a qualifying poker hand losing to another player with a better hand that is also qualifying. Generally, when a bad beat occurs at a casino poker room, anyone currently playing either at that table or at that casino may share in the "Bad Beat" jackpot.

Other options to entertain casino patrons include a bonus prize awarded when a threshold value is accumulated in the progressive bonus pool.

Thus, there is a need for a system and method that allows a gaming environment to provide excitement and variety to players at any time. There is a need for a system and method for providing shared wins in a gaming environment.

BRIEF SUMMARY OF THE INVENTION

Certain embodiments provide a system and method for providing shared wins in a gaming system. Certain embodiments include a method for awarding a shared prize. The method includes establishing a shared win award, wherein the shared win award has an amount or a value. The method also includes identifying one or more players eligible to participate in a shared win, wherein eligibility of a player is independent of player choice. The method further includes determining a shared win event and awarding at least a portion of the shared win award to each of the one or more eligible players.

In an embodiment, the method also includes activating the shared win at a certain time. The method may also include activating the shared win during a certain time period. In an embodiment, eligible players are identified at a certain time, for example. At least one group of players may be defined as eligible to participate in a shared win. In an embodiment, at least a portion of the shared win award is awarded to each of the one or more eligible players based on a criterion. The shared win award may be a static amount, a non-progressive award, and/or other award, for example.

In an embodiment, the method includes assigning a sharing percentage of the shared win award to each of the eligible players as a function of relative play among the eligible players. The sharing percentage assigned to a player may be adjusted based on play of the player relative to other eligible players, for example.

Certain embodiments include a computer-readable storage medium including a set of instructions for a computing device. The set of instructions includes a configuration routine for configuring parameters of a shared win, wherein the parameters include at least one of a shared win award, a shared win event, a shared win time period, and a sharing percentage. The set of instructions includes a selection routine configured to allow an authorized user of a gaming establishment to identify players or selection criteria for participation in a shared win game. The set of instructions also includes a monitoring routine for monitoring play of eligible players during the shared win time period. Additionally, the set of instructions includes an award routine for allocating the shared win award among the eligible players based on the sharing percentage.

In an embodiment, the shared win routine allocates the shared win award based on at least one criterion. In an embodiment, the monitoring routine dynamically adjusts the sharing percentage for each of the eligible players, and the award routine allocates the shared win award among the eligible players based on the sharing percentage. The shared win award may be a static award, a non-progressive shared win award, and/or other award, for example. In an embodiment, the selection routine allows selection of players eligible for the shared win game without player interaction in the selection.

Certain embodiments include a gaming management system providing a shared win. The system includes a shared wins manager configured to set parameters for a shared win game, wherein the shared wins manager allows selection of eligible players for participation in the shared win game. The system also includes a gaming terminal, wherein the gaming terminal executes a base game for play by a player, and wherein the gaining terminal is capable of operating a shared win game along with the base game. In addition, the system includes a meter or equivalent associated with the player, wherein the meter or equivalent tracks play of the player during the shared win game, and wherein the meter or equivalent is used to determine the player's percentage of the shared win award. The shared wins manager divides a shared win award among the eligible players upon occurrence of a shared win event.

In an embodiment, the shared wins manager dynamically determines an award sharing percentage for the player based on the meter or equivalent. In an embodiment, the player wagers a certain amount to become eligible to participate in the shared win game. A percentage of the shared win award that is allotted to the player may increase as the player plays eligible games, for example. In an embodiment, occurrence of the shared win event may be independent of a winning result occurring in the base game. In an embodiment, the shared wins manager is capable of configuring a recurring shared win game based on a schedule. The shared wins manager may be capable of defining one or more groups eligible for one or more shared wins. In an embodiment, the system further includes a card reader capable of determining player eligibility for the shared win based on player card information, In an embodiment, the shared win award may be automatically credited to a player account, for example.

DETAILED DESCRIPTION OF THE INVENTION

Figure 1:
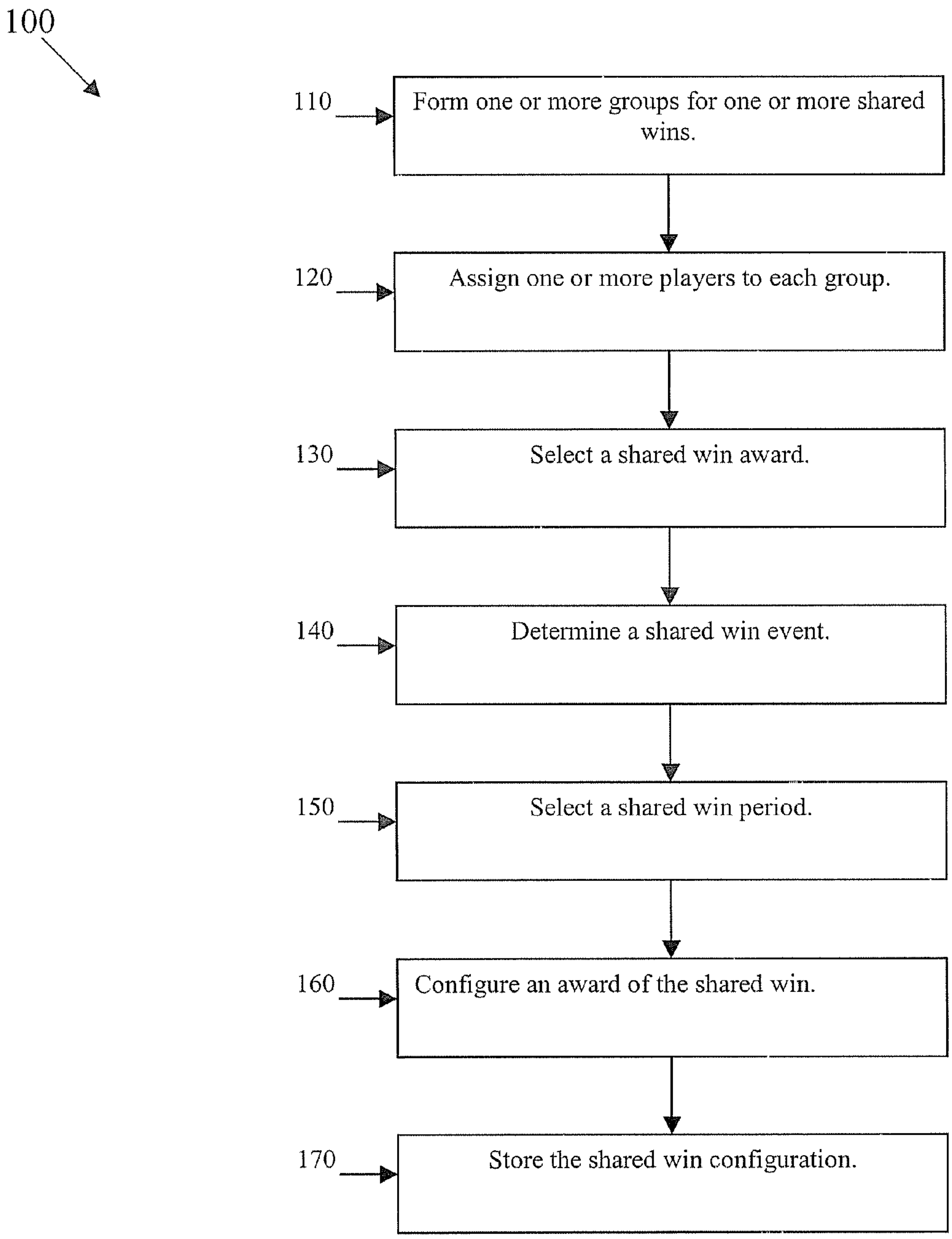
FIG. 1 illustrates a flow diagram for a method for configuring a shared win used in accordance with an embodiment of the present invention.

FIG. 1 illustrates a flow diagram for a method 100 for configuring a shared win used in accordance with an embodiment of the present invention. First, at step 110, one or more groups are formed for one or more shared win games. Groups may be formed by an operator and/or software system based on one or more criterion, such as game type, player type, award type, location, event and/or other setting. Then, at step 120, one or more players are assigned to each group. For example, players matching the one or more criterion used to define a group may be assigned to that group. In an embodiment, a player may participate in multiple groups and/or multiple shared wins. In an embodiment, players may be added to groups automatically based on defined criteria and/or may be added manually by an operator, for example.

Next, at step 130, a shared win award is selected. For example, a monetary prize, a number of promotional or compensation points, a discount or voucher for goods or services (such as event tickets, free hotel stays, etc.), a product (such as cars, cellular phones, radios, etc.), and/or other reward may be selected by an operator and/or software to be the shared win award. In an embodiment, a plurality of similar prizes may be selected to be awarded to each of a plurality of eligible players when a shared win event occurs. In another embodiment, a single prize is selected to be divided among a plurality of eligible players when a shared win event occurs. In an embodiment, a first prize is selected as the shared win award for the player who triggers the shared win event, and a second prize or group of prizes is selected for award to other eligible players when the shared win event occurs.

At step 140, a shared win event is determined. For example, a certain hand of poker (e.g., a video and/or table game), a certain slot reel combination, a certain time, and/or other event or combination of events is determined to trigger the shared win. Then, at step 150, a start time and end time for the shared win are selected. For example, a user or system may select a number of minutes, hours, days and/or other increment during which the shared win will be active. In an embodiment, a recurring schedule may be established. For example, a recurring shared win may be configured every Sunday from 11:00 pm to 1:00 am. In an embodiment, a number of handle pulls/plays and/or a number of players may be used to set a time limit or other restriction on a shared win. In another embodiment, a time period is measured from the last shared win event to the next shared win event to identify players eligible to share in the award. In an embodiment, players may be purged from shared win eligibility after a certain interval, such as a shared win event, a plurality of shared win events, and/or a change of player and/or game circumstance.

At step 160, an award of the shared win is configured. For example, division of the shared win amount or allocation of a plurality of shared win prizes is configured. Criteria for player percentages may be determined, such as award size/type, wager made, games played, amount won/lost, player history, game type, location, number of eligible players, etc. Player percentages may be fixed and/or variable amounts, for example. Then, at step 170, shared win configuration is stored. For example, starting player percentages are entered and/or percentage criteria are entered. Player eligibility through use of a card and/or non-card eligibility criteria may be determined, for example. Presence of a player upon occurrence of the shared win event versus during the shared win time period may also be configured, for example.

Figure 2:
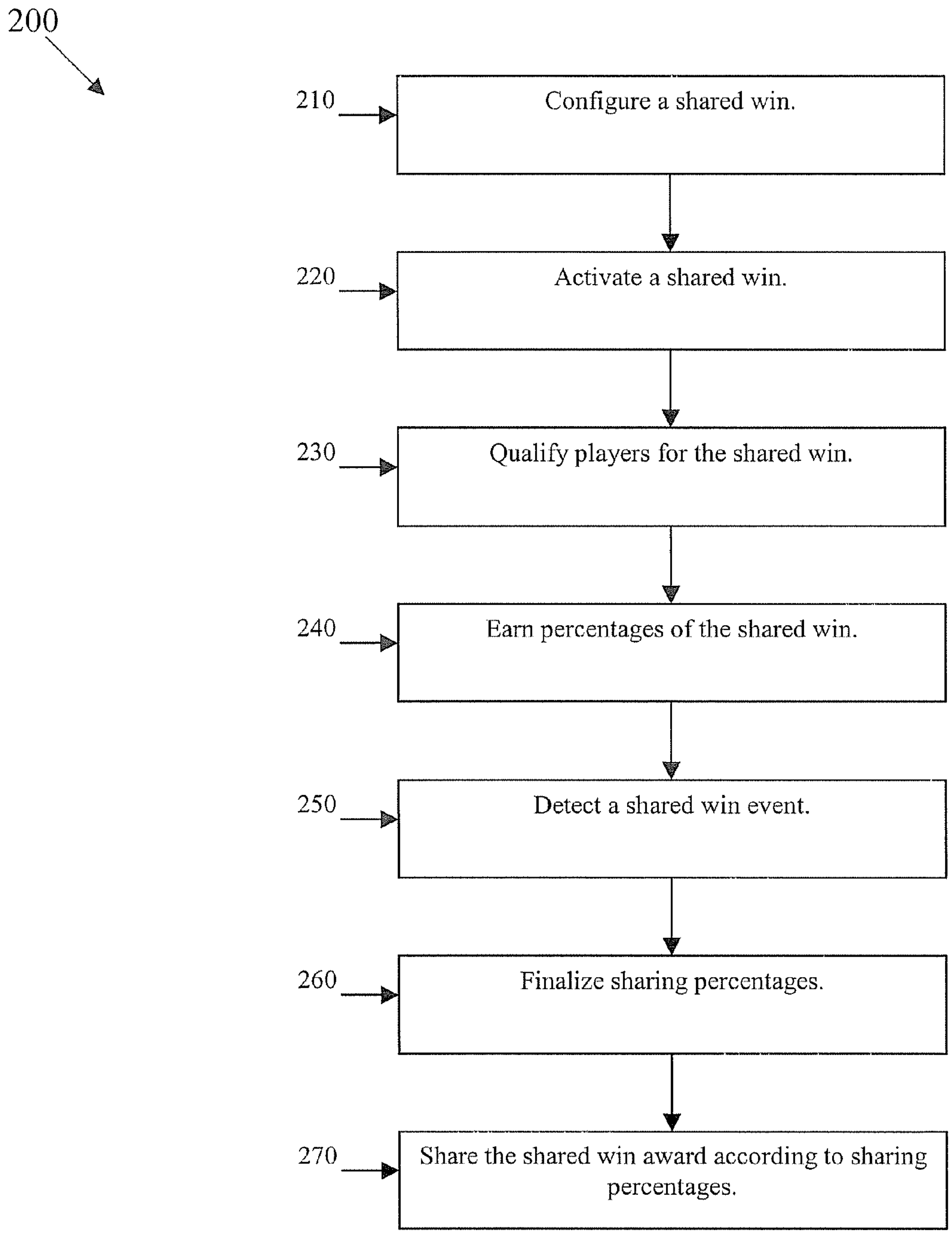
FIG. 2 illustrates a flow diagram for a method for providing a shared win game used in accordance with an embodiment of the present invention.

FIG. 2 illustrates a flow diagram for a method 200 for providing a shared win game used in accordance with an embodiment of the present invention. First, at step 210, a shared win is configured. A shared win may be configured as described above in relation to FIG. 1, for example. Then, at step 220, a shared win is activated. For example, the shared win time period or other eligibility restriction begins. Next, at step 230, players qualify for the shared win. Based on criteria established for the share win game, players qualify by playing during the shared win period, playing win a shared win occurs, and/or playing at least a certain number of times and/or a certain amount wagered during the shared win period, for example. In an embodiment, players must belong to a certain group or groups to be eligible for a shared win. At step 240, qualified players play and earn percentages of the shared win. In an embodiment, eligible players begin at a default percentage of the shared win. Increased play, wins, wager, and/or other activity may increase a player's percentage of the shared win, for example.

At step 250, a shared win event occurs. For example, a royal flush, a series of three 7's, and/or other shared win event is achieved by a player. In an embodiment, the shared win event is achieved by an eligible player to trigger the shared win. In another embodiment, the shared win event may be achieved by any player. Then, at step 260, sharing percentages are finalized. For example, eligible players may begin at a uniform sharing percentage (e.g., prize value divided by number of eligible players). In an embodiment, individual and/or group sharing percentages may change during the shared wins period. For example, as a player plays more (e.g., more games played and/or more money wagered), that player's sharing percentage increases. The percentage increase may be relative such that if Player A plays more than Player B, Player A's sharing percentage increases while Player B's sharing percentage decreases, for example. The shared wins or casino management system may dynamically adjust sharing percentage based on one or more criterion until the shared win event occurs. Finally, at step 270, the shared win award is shared according to the sharing percentages.

The shared wins system may be configured by a gaming establishment, such as a casino, to create group(s) of players that may shared in winnings that occur within the group(s). Groups or teams may include players, types of gaming devices (e.g., slot machines, video poker machines, table games, Bingo, Keno, and/or other gaming terminals), denominations, par percentages, areas of a gaming establishment (such as a casino, restaurant, or store), single or multiple gaming establishments, player interests, birthdays, anniversaries, families, bus tours, player reward levels or ratings, time schedules, tournaments, etc. In an embodiment, players may belong to one or more groups.

In an embodiment, the shared wins system may be configured to specify whether a player card must be inserted for a player to participate and/or if one or more cards may be used by a single player to participate in a shared win. The shared wins system may be configured to determine a percentage of a shared win that is awarded to each player and how the percentage may change may depend upon selection criteria such as time played, amount played, amount won, amount lost, etc.

In an embodiment, a shared win may be configured as well within the shared wins system. The shared win may be configured as a lump sum of money, an amount of money that increases based on time and/or play, a non-monetary prize or prizes, etc. The shared win may be based on a list of qualifying wins (e.g., level x progressive jackpot, non-progressive top award jackpot, non-progressive hand pay of any kind (configurable), etc.).

Once a group of players is established and parameters for the group are configured, the information is transferred to a management system, such as an OASIS system or other casino management system. When a player who is part of the group inserts his or her player card and/or plays without a player card (depending upon the configuration), the player may be eligible for a percentage of the shared win. As players play and/or stop playing, the percentage of the shared win for a player may increase or decrease based on the shared win configuration. Players may be awarded a percentage of the shared win based on play between a prior shared win payout and a current shared win payout, for example.

Once any player in a shared win group completes a qualifying shared win (i.e., achieves a shared win event), the entire group is awarded their percentage of the shared win (i.e., their "piece of the pie"). If the shared win award is a cash award, promotional amount, or point value, the award may be added to an electronic balance (such as a PersonalBanker cash balance, a PersonalBanker promo balance, and/or a point balance), hand paid, and/or machine paid, for example. If the cash award is automatically added to an electronic balance, the cash or point award may be made immediately available for use by the player without going to the slot club area or casino cage to manually redeem winnings. If the shared win award is a non-cash or point award, such as a prize, comp, and/or other non-cash award, the award may be redeemed at a slot club booth, casino cage, concierge desk, and/or other location where a player is able to redeem points for products or services, such as a gift shop, restaurant, hotel, spa, theater, amusement park, store, etc.

In an embodiment, a shared win may be offered to one or more groups at certain times, such as early morning, mid-week, at historically slow times, and/or at historically busy times to generate excitement and a larger volume of players. In an embodiment, a shared win may be configured to not exceed a maximum value and/or fall below a minimum value. In an embodiment, player percentages may fluctuate and/or remain constant based on playing time, wagers made, and/or other criterion, for example.

Thus, certain embodiments provide a shared wins system and method that does not require additional wagers or actions to participate in a shared win. Certain embodiments provide a shared win without additional interaction between a player and a gaming terminal. Additionally, certain embodiments provide a shared win award without contribution to a communal jackpot. Certain embodiments provide a static shared win award determined by an event that is configurable by a user. When the event occurs, an eligible group is awarded pieces of the shared win.

Figure 3:
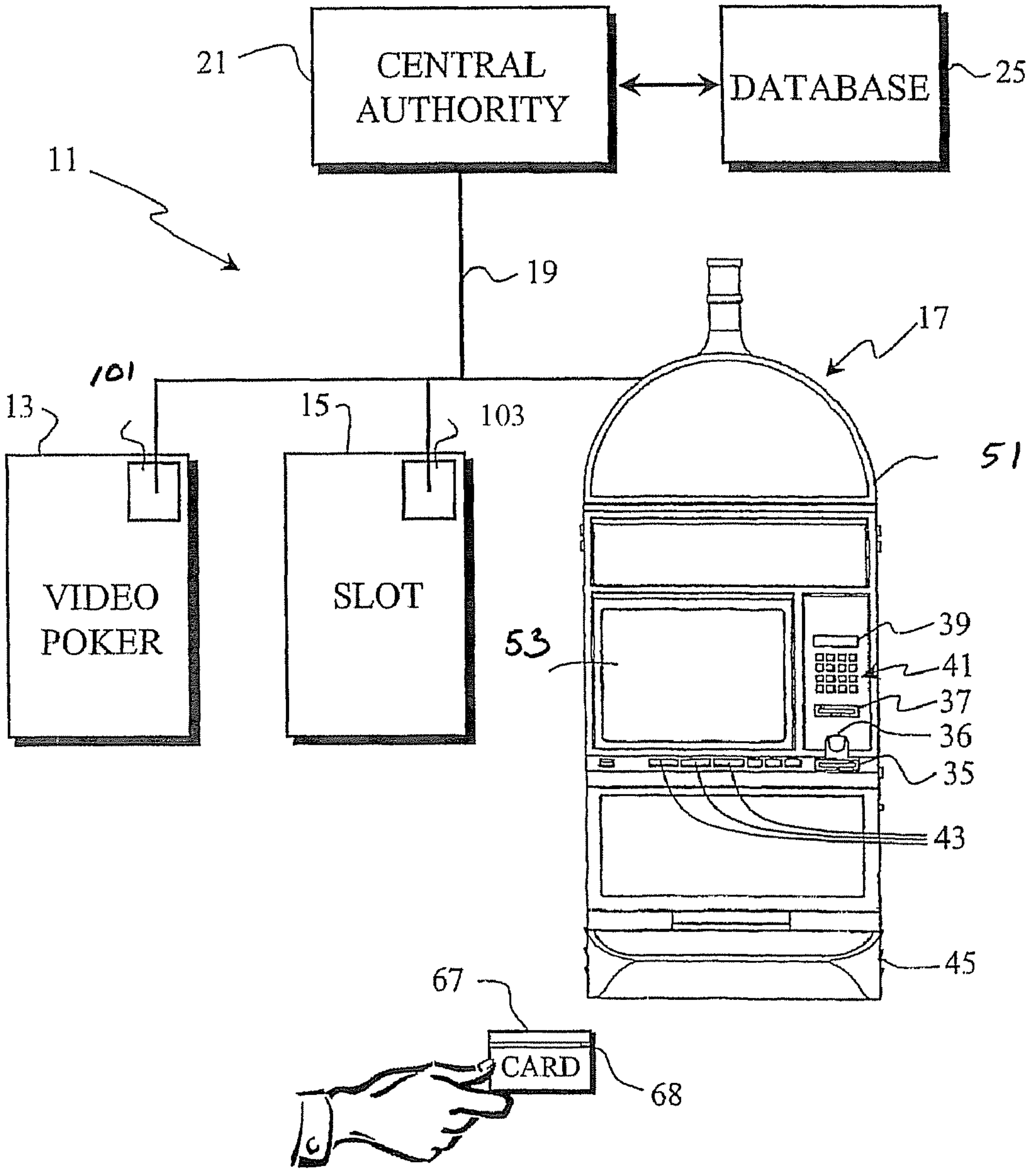
FIG. 3 depicts a gaming management system with shared wins capability in accordance with an embodiment of the present invention.

A casino or other gaining establishment management system may be configured to operate one or more shared wins with one or more groups of players. FIG. 3 depicts a gaming management system 11 with shared wins capability in accordance with an embodiment of the present invention. Referring to FIG. 3, an example of a game management system 11 includes a plurality of gaining machines 13, 15, and 17 interconnected across a network 19 to a server 21. Gaining machines 13, 15, 17 may utilize applications or web services of server 21 to provide visual displays, such as slot or video poker displays. Gaming machines 13, 15, 17 may communicate with server 21 via network 19 using standard or proprietary, custom protocols, for example. Network 19 may include subnetworks using RS485 serial communications standard, for example, and data collection units (not shown). Network 19 also may be configured as an Ethernet network employing TCP/IP protocol, or may comprise a digital subscriber line (DSL) network, a fiber optic network, an RF network, etc.

Each gaming machine 13, 15, 17 includes a smart communications interface (SCI) 101, 103, 105 (105 is not shown). SCIs 101, 103, 105 may communicate directly onto network 19 and/or communicate with network 19 via a data port unit (not shown). SCIs 101, 103, 105 may also communicate with gaming controller(s) (not shown).

Server 21 may be designed to run on a network platform and to service requests from gaming machines 13, 15, 17. Server 21 may be accessed from network 19, through standard networking protocols, such as transmission control protocol/internet protocol (TCP/IP), user datagram protocol (UDP), telnet, file transfer protocol (FTP), hypertext transport protocol (HTTP), internet control message protocol (ICMP), internet group management protocol (IGMP), etc. Documents, such as hypertext markup language (HTML), extensible markup language (XML), rich text format (RTF), etc., may be transmitted to and/or from server 21.

Server 21 may have a single or multi-tiered architecture that includes at least one software layer including one or more applications, an application program interface (API) and an operating system, for example. The applications provide a number of different services, including accounting services, player tracking services, progressive game services, browsing services, cashless play services, etc. The applications may be written in various languages including, for example, C#, Java, or SQL. The operating system for example, is a Windows® brand operating system which provides conventional functions.

Server 21 may push out, i.e., publish, information to various subscribers including gaming machines 13, 15, 17. For example, gaming machine 13 may subscribe to a shared win, a progressive game or a “bonus time” alert. Server 21 notifies gaming machines that have subscribed that a shared win period has started and that jackpots are to be paid out at twice the pay table, for example. The shared win for particular gaming machines may be subscribed to, for example, using a casino workstation (not shown). The workstation may communicate a request to server 21 to publish to specifically identified gaming machines that a shared wins period is to begin. The request may also provide additional information as to the amount of the shared win, the type of shared win, sharing percentage(s), etc. The request may also ask server 21 to publish the end of the shared win period as well. The server 21 may provide such a shared win game in real time with the shared win event, or merely provide a scheduled command for future shared win events.

Server 21 may include a plurality of functions that may be called by other systems or devices connected to network 19. Such functions may include conventional method or function calls as well as remote calls, e.g., proxy and simple object access protocol (SOAP)/XML invocations. For example, server 21 may be called by gaming machines 13, 15, 17.

Server 21 provides data to or retrieves data from a database 25. For example, data is stored as to gaming activity, player account information, advertisements, ticketing, etc. For example, meter or equivalent data is received by server 21. Server 21 stores the meter or equivalent data in a database. Meter or equivalent data may include player win/loss data, shared win data, bonus jackpot data, progressive link/level data, gaming machine coin-in/payout data, etc. Also, data may be retrieved including player information, accounting data, application programs, etc.

For purposes of simplicity, only three gaming machines 13, 15, 17 are shown in FIG. 3. In actuality, a casino may contain hundreds, or even thousands, of gaming machines. In addition to gaming machines, a casino may include various non-gaming machine locations, such as craps and blackjack. Such locations include an SCI, similar to SCI 101, 103, or 105, which is connected to network 19. In an embodiment, gaming and non-gaming machine locations may be spread throughout several casinos located remotely from one another.

Server 21 provides services for each gaming machine. Server 21 may provide different services for different gaming machines. For example, gaming machines may be included in a shared win game and thus use a shared win service from server 21. Typically, all gaming machines use an accounting service from server 21 which accounts for coins and bills inserted into the gaming machine as well as an accounting of coins cashed out of the gaming machine to a player.

Other services, such as player tracking and cashless play services, may be provided by server 21. A typical player account may be stored in a database for tracking of the player. The player accounts are updated by server 21 as player information is sent to server 21 from gaming machines 13, 15, 17, a workstation or an external system (not shown). For example, a restaurant acting as an external system may request server 21 to add loyalty points to the player’s account in the database based on the amount of money spent by the player at the restaurant. As another example, a player at gaming machine 13 may request server 21 to convert 1000 points of the points balance in the player’s account to credits on the credit meter or equivalent of gaming machine 13. As another example, server 21 may provide game programs or other parameters to a particular gaming machine.

More specifically, gaming machine 13 sends a service request to server 21. SCI 101 packages the request in a proper protocol and places the request onto network 19. Various switches and/or routers may be included in network 19 in order to route the service request to server 21. The request may include (1) data, (2) a message request, and (3) the network address of server 21. The message request seeks a particular service to be performed by execution of an application by server 21. The application is run in connection with the data, if any, in the request. The application may then generate a message back onto network 19 addressed to machine 13. SCI 101 receives the message and responds accordingly, as for example, adjusting the credit meter or equivalent, generating a display of information to the player, etc.

Alternatively, SCI 101, 103, or 105 may be connected to a hub for wireless communication of the service request to the network 19. The service request is received by the hub, repackaged and then broadcast to a receiving device that is connected to the network. The receiving device packages the service request and places the service request onto the network.

Gaming machine 17 is shown in more detail in FIG. 3 and includes a housing 51 that supports a number of components including a main display 53 that is positioned on the outer front face of the machine for direct presentation of a display to the player. An input area 35 receives a wager from the player in the form of currency bills or bar-coded vouchers. A card receiving slot 37 is positioned to receive a player card for use to identify the particular player at the gaming machine, as described hereinafter. A secondary display 39 also may be included, for the display of supplemental non-game information to the player, typically, in the form of instructions, points balances, or other information. As understood, all or part of supplemental display 39 may take the form of a display window located on primary display 53 or a secondary window on display 53. A keypad 41 is provided to allow the player to input data to the SCI of the gaming machine, particularly in response to instructions or questions on supplemental display 39. In addition, a plurality of decision making buttons 43 (and optionally a handle, not shown) are used by the player to play the game of machine 17. A payout tray 45 provides an area for redemption of awards based on play of the game, and a printer (not shown) may be used to print tickets or other redemption documents.

Display 53 displays the primary game features for play of a game. For example, the display may generate a conventional slot game in which a plurality of symbols are moved within their respective column, as if rotated, at the appropriate time in response to the user activation of the gaming machine.

The casino issues a player a player card 67 through an application process. Player card 67 typically includes a magnetic stripe 68 that is encoded with data to identify the player. In some cases, a personal identification number (PIN) is given to the player for security, and may allow access to certain features of the gaming machine. Card 67 is readable by a card reader found in each of the gaming machines 13, 15, 17. Other types of cards may be utilized including optical cards, smart cards, etc.

In addition, a unique number is encoded onto a magnetic stripe 68 carried by the card. This unique number corresponds to a player account file which is maintained by central authority server 21 in database 25. The account file may include information such as the player's name, address, amount of credit available, amount of promotional credits, amount of loyalty points, etc.

The player inserts his or her player card 67 into card receiving slot 37 for reading by a card reader. SCI 105 detects the card insertion and receives the identification information contained on card 67. For example, the player's name, address and player tracking account number may be encoded on the magnetic stripe. The information contained on card 67 may be a reference number to retrieve player data from database 25. A player card, smart card, radio frequency identification (RFID) device, and/or other mechanism may be used to participate in and/or track information for a shared win, for example.

SCI 105 provides display signals to display 39 in order to, for example, display the player's name, progressive amount(s), game information, supplemental information, and/or other message. Select messages may be displayed, for example, requesting the player to optionally enter his or her personal identification number (PIN) using keypad 41. Where the PIN is optionally entered by the player, SCI 101 communicates with the central authority 21 in order that the PIN, for example, may be used to validate the player's identity. In other cases, the PIN may be used to access some features of the gaming machine 17 or system 11. Either the central authority or the SCI performs validation.

SCI 105 gains access to the player's account at the central authority 21. The player's account typically includes the number of player points (loyalty points) previously accumulated by the player, as well as additional statistics. In order for the gaming activity at a particular machine to be credited to the player's player account, the player or player account is identified at the gaming machine. Identification is typically accomplished by the player inserting his or her player card.

A PIN alone without a player card may be used to provide player identity to the gaming machine; and a card alone without a PIN may be used to provide player identity to the gaming machine. Alternatively, any of several biometric devices may be used to identify the player, including devices to check fingerprints, scan facial appearance, provide eye scans, etc. Such biometric input data may be used alone or in combination with player cards or PINS.

During game play, a gaming machine CPU may track gaming activity and provides gaming activity information to SCI 105. Such information may include an amount of money a player has wagered on each game, a number of games played, a time each game was initiated and a particular identification of a gaming machine, etc. For example, a system may track money wagered, money won and the time period tracked. Tracked information may be obtained by the SCI polling the CPU. The game activity information is sent to the central authority by the SCI. The central authority utilizes the game activity information to perform accounting functions and additionally generates player points which are added to the points in the player's account. Awards are provided by the casino in accordance with points accumulated by the player.

Any pre-stored data in the player's account may be downloaded to SCI 105 which in turn provides corresponding signal data to the gaming machine 17. Where gaming machine 17 allows for player selection of the particular game played, players may pre-store their game preference in central database 25. Preference data may be downloaded to gaming machine 17 after player identification at the gaming machine.

The communication between SCI 105, central authority 21 and gaming machine CPU may take on different forms and protocols, as for example, serial, parallel, Ethernet, etc. In one embodiment, the SCI may be connected to the CPU through a serial connection and communicates in accordance with a particular communication protocol or protocols depending upon the manufacturer of the particular gaming machine.

After a particular player has been identified as a valid player, other messages are presented on display 39. For example, the balance amount of points or credit remaining in the player's account may appear on the display. The player may use key pad 41 to download credits to the gaining machine, for example.

In accordance with a configuration of gaming machine 17, the gaming machine begins a game (for example, the reels spin) automatically after the credits appear on the credit meter or equivalent or the game is started after the player presses a button 43 or pulls a handle (not shown).

Then, the game ends and a particular result appears. The gaming machine pays out certain amount(s) depending upon the result in a conventional manner. The pay out may include applying an amount directly to a credit meter or equivalent, or paying the amount in coins or tokens directly from the slot machine to the player at tray 45, or where the amount is above a threshold level, a hand pay is made of the amount to the player. The player may cash-out credits by activating a cash-out button 43 or upload credits to the player's account in database 25. A ticket printer (not shown) may be used to dispense bar coded vouchers on cash-out, as well. In an embodiment, the pay out may also include a bonus payout and/or portion of a shared win award, as described above.

If a player desires to discontinue play or move to a different machine, the player removes the player card. Thereafter, the player card may be inserted into the same or a different gaming machine for continuing play.

The player's account may be formed of multiple accounts, for example, a CASH account, a POINTS account, a PROMO account, etc. Credit may be placed in the player's PROMO account by the casino as a complimentary incentive. This may happen when a player first arrives at the casino at hotel check-in or other event. Alternatively, credit may be applied to the player's CASH account in accordance with the player making a deposit of money, either coins or tokens directly into the slot machine or at a cashier. Such credits (or value) may be downloaded to the gaming machine and placed on a credit meter or equivalent.

The player's gaming activity is tracked by system 11 once the player account is established, the player has been issued a player tracking card bearing a unique identification number and the account is in a file in database 25, for example. The player's transactions at the gaming machine are logged by SCI 105 and reported to central authority 21.

In some situations, multiple player cards may be issued for a single account; each card identifies the same account. Each card may carry the same identification number. For example, a husband and wife may share a single account. The first card inserted allows the player to retrieve any or all of the credit available in the player's account. The second card inserted allows the second player to retrieve any remaining credit that remains in the account. Where both cards are simultaneously used on separate gaming machines, all player transaction activity is collected and forwarded to the player's account.

Numerous types of reports may be generated based upon the transaction activity logged in the player's account. For example, the amount of money played by the customer, the amount of credit used from the player's account, the amount of complimentary incentive credit utilized by the player, the amount of points converted to play credits at the game, the machine upon which the transaction occurred, the time of the play, or other event, etc.

Gaming machines 13, 15, 17 may include one or more accounting meters or equivalent devices/data structures that log transaction and machine data. Meters may be formed of electronic memory and/or hard meters, for example. Meters may be updated in response to various gaming machine events. Meters may be non-reset, accumulative meters; however, some meters may be reset meters and statistics are available since the last reset of the meters. Basic events in which meters are adjusted may include: (1) money input by the player; (2) wagers placed by the player; (3) game wins from play of the game; (4) shared wins involving the player; and (5) cash out of credits by the player.

Only the particular meter(s) to which an event pertains are adjusted upon the occurrence of the event. Data identifying the occurrence of events may be recorded also, including the time of the event and the particular type of event.

For example, meters may include various drop meters to track money flow. A drop meter or equivalent may be provided for each of the different forms of monetary value accepted by the gaming machine. For example, a coin drop meter may represent the total value of coins that fall to a "drop bucket" within the gaming machine housing for later collection by the casino. Also, coins may instead be diverted to a hopper system for later payout to the player and such diverted coins may be metered separately. Also, a bill count drop meter or equivalent may count all paper currency that has been inserted into the bill acceptor. As another example, promo count meters count promotional credits that are received by the gaming machine from bar coded coupons, downloaded credits, bonus point conversions, and the like. Outflow of cash to the player may also be tracked by meters, including printed vouchers that have been issued by the machine.

Meters and/or equivalent devices/data structures may also keep track of game activity and include a game play meter for tracking the total number of bets actually wagered and a game win meter for tracking the total number of wins. Meters and/or equivalent devices/data structures may also track progressive amount(s) for different progressive link(s) and/or level(s) within a link. Shared win meters may track a player's participation and/or sharing percentage in a shared win game, for example. Purchased credits that are not wagered, but cashed out, may be tracked as well. Credit meter is a visual meter that reflects the total amount of credit available to the player at any time, and may be driven from another meter.

A gaming machine CPU communicates data to SCI 105 including events and readings of the accounting meters. For example, SCI 105 may poll a CPU for data, and then record such data in a memory. The data may be further processed by SCI 105, and then the processed data is stored in memory. Particular data stored in memory includes accounting data as well as player data that is used to award player points.

SCI 105 performs game accounting functions by updating accounting data and player data. SCI 105 transmits data to central authority 21. In addition, accounting data and player data may be initialized by central authority 21.

Tracking of data at the gaming machines occurs for carded and non-carded players. A non-carded player is a player who does not insert a player card during play. SCI 105 may retrieve data from CPU 61 including data stored by a CPU in meters. SCI 105 may also keep data that SCI 105 has obtained from sources other than a CPU, such as data obtained from a card reader. SCI 105 may process the data and convert the data to a particular form prior to transmittal to central authority 21. For example, data regarding a number of coins played during a certain period of time may be calculated by SCI 105 based on coin-in meter data at a start of the period and coin-in meter data at an end of the period.

SCI 105 reports certain data to central authority 21 which is placed in database 25. However, SCI 105 reports particular data, i.e., player data, which is related to the game activity of the player. Central authority 21 uses player data to calculate player points and store player points in a particular player account held in database 25. For example, central authority 21 may calculate a number of loyalty points based on coin-in data of the player, and thereafter store points data in a player account. Alternatively, SCI 105 may perform points calculation and transmit the points data for storage in the player account in database 25.

SCI 105 may report a variety of accounting data to central authority 21 at various times. SCI 105 reports player data which SCI 105 has accumulated in connection with the occurrence of a gaming session. The data may be reported when a player removes his or her player card from the card reader. Where a player has the ability to convert points stored in his or her account to credits at the gaming machine, the timing of points credited to the player account may become important. It may be desirable also to forward player data at predetermined times, for example, every hour, where the player's gaming session occurs over a lengthy period of time.

Gaming machines, such as gaming machines 13, 15 and 17 may be implemented, for example, as slot machines, video poker machines, video roulette machines, and the like. Gaming machines 13, 15 and 17 may be located in a local gaming environment, such as a casino, and/or a multi-site gaming environment, such as a plurality of networked casinos. Gaining machines 13, 15 and 17 may be used to play a first game and/or a second game employing one or more progressive jackpots as a reward. In an embodiment, a progressive jackpot used as a reward for a second game may be automatically determined by a gaming machine, progressive controller, and/or other server. A progressive jackpot may also or alternatively be selected by a player and/or determined by an outcome of the second game. In an embodiment, gaming machines 13, 15, and 17 may be used to participate in a shared win game.

In an embodiment, a game controller controls operation of a gaming machine. The game controller may include a microprocessor, memory, game software, and support circuitry to implement a slot machine or other type of game, for example. A gaining machine display presents to a player a representation of a pending credit in the gaming machine 13, 15 and 17 (e.g., $455.50). The display also may display information relating to the second progressive game, such as the value of the progressive amount and the name of the most recent winner of the progressive jackpot for the second game. During play, the game controller tracks the pending credit according to the rules of the game and the interaction with the player (including the deposit of additional funds via a coin comparator or bill validator).

Figure 4:
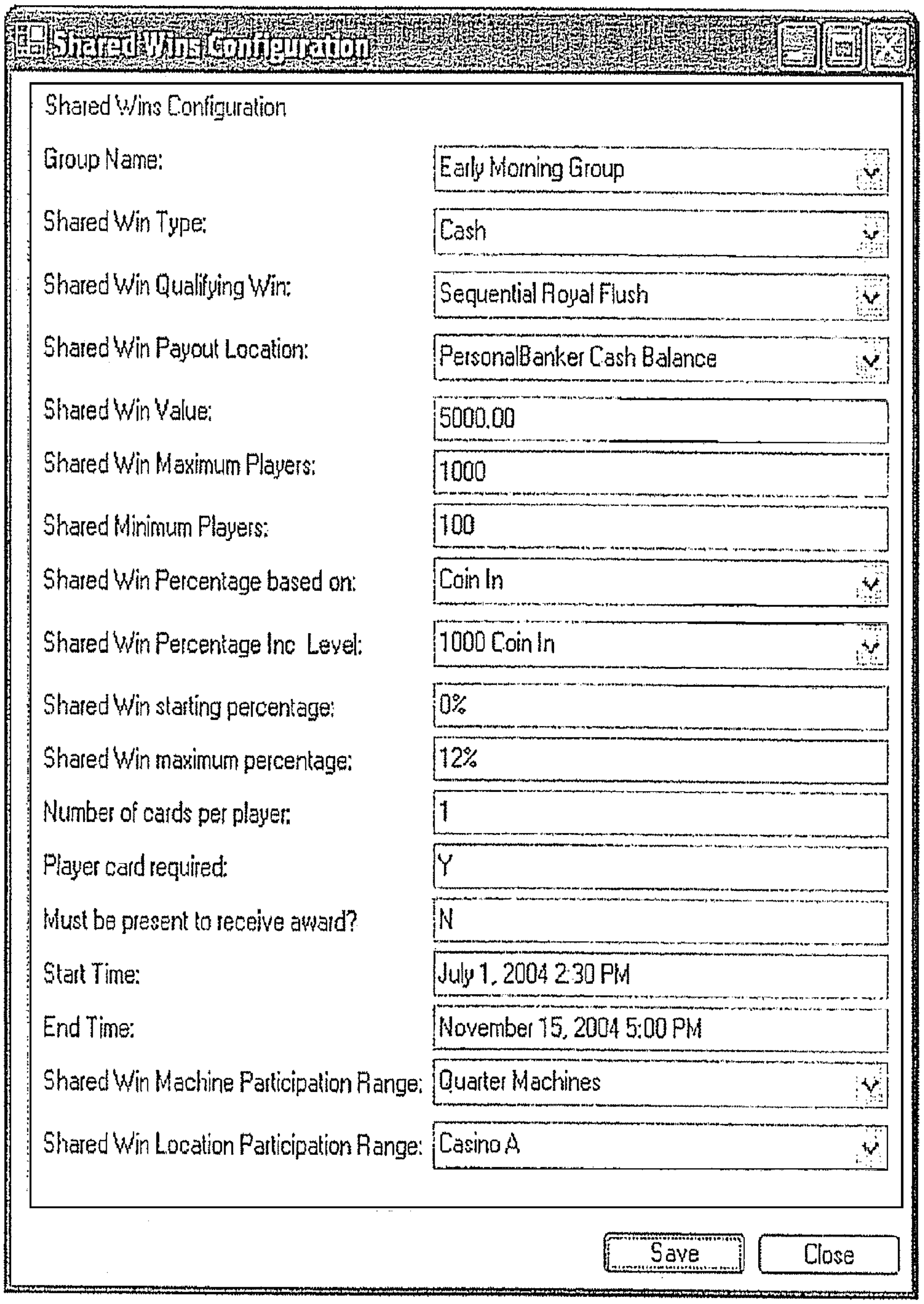
FIG. 4 shows an example of a shared wins configuration interface used in accordance with an embodiment of the present invention.

In an embodiment, gaming machines 13, 15, 17 and/or central authority server 21 include software for configuring and running games and special programs in the system 11. For example, one or more shared win games may be configured on the system 11. An example of a shared wins configuration interface is shown in FIG. 4. Eligible players are determined, and meters and/or equivalent devices/data structures may be used to track player participation data in the shared win. Upon occurrence of a shared win event, the shared win award is divided among the participating players as described above.

In an embodiment, a shared win game is configured by authorized gaming personnel entering configuration information, as shown in FIG. 4. The configuration information is transferred through the system 11 on a regular basis and/or when a player card is inserted. As players play, the players accumulate points within the system 11 as with a regular game, but the coin in, coin out, or other player points accumulate towards a shared win percentage as well as the traditional base game. When a player has played enough to earn a shared win percentage, for example, based on the shared win configuration settings, the player becomes eligible to participate in the shared win if the shared win event occurs. As additional players in a group play and earn percentages toward the shared win, the system 11 adjusts each player's percentage as necessary. For example, if one thousand eligible players are playing in a shared win, the system 11 will ensure that, as the players play and percentages are achieved, the total percentage does not exceed one hundred percent.

When a qualifying shared win event occurs, the system 11 may be notified in several ways. For example, notification may occur automatically via serial or other protocol between the server 21 and the gaming machine 13, 15, 17. A manual notification may be made by a gaming establishment employee when processing an award that meets the shared win event criteria, for example. Automatic and/or manual notification may occur from other sources, such as a gaming establishment employee manually sending notification when a certain event occurs, such as a "cover all", and/or automatic notification from a progressive system controller when a certain type of progressive jackpot occurs. In an embodiment, one or more shared win events may be defined. One or more of the shared win events may or may not correspond with winning outcomes in a base game, for example.

At the time of the qualifying shared win event, the system 11 uses the shared win configuration for the shared win event to determine the shared win award for each eligible player. Each player is awarded his or her "piece of the pie" based on the configuration of the shared win. Alternatively, player shared win awards may be manually determined and/or awarded.

In an embodiment, the system 11 may be configured to send out pages, e-mails, text messages, and/or other communication to gaming establishment personnel and/or patrons, display on signage or other system displays, and/or display on websites or other media to announce that a shared win event has occurred, for example. The system 11 may also be configured to send messages to system hardware to display shared win information on individual system displays when a player inserts his or her player card in a gaming machine and/or already has a player card inserted, for example.

Thus, certain embodiments provide a new and exciting feature to attract players who will want to have an opportunity to share in the winning. Certain embodiments provide an ability to share in winnings even if a player did not trigger the win. Certain embodiments provide an ability to increase a player's portion of the possible shared winnings based on how much a player players, how often a player plays, and/or other factors based on the shared wins configuration. Certain embodiments provide a flexible shared wins system with a vast range of possibilities to attract new players, increase time spent by existing players in a casino or other gaming environment, and increase handle and profits for a gaming environment.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

The invention claimed is:

1. A method for awarding a shared prize to players playing a shared win game using gaming machines of a gaming system, said method comprising:

assigning one or more players to a group based on a first criterion;

establishing a shared win award at least a component of which is divisible between one or more eligible players of said group, said shared win award having a fixed value determined prior to initiating the shared win game;

identifying said eligible players to participate in winning a percentage of said component of said shared win award, wherein eligibility is based on a second criterion different than the first criterion;

initiating the shared win game;

assigning to each of said eligible players a sharing percentage as a function of each's rate of play during an eligibility period within said shared win game, wherein each's sharing percentage is subject to change during said eligibility period;

determining an occurrence of a shared win event, said occurrence of said shared win event fixing said each's sharing percentage; and awarding at least said component to said eligible players based upon each's sharing percentage.

2. The method of claim 1 wherein said rate of play is based upon number of games played.

3. The method of claim 1 wherein said rate of play is based upon amount of money wagered.

4. The method of claim 1 wherein said eligibility period is measured from the last shared win event to the next shared win event.

5. The method of claim 1 wherein said identifying said eligible players is determined based on player information data provided by one or more player cards and from configuration data received using a graphical user interface.

6. The method of claim 1 wherein said rate of play is based upon number of games played and amount of money wagered.

7. The method of claim 1 wherein said first criterion comprises an amount of money played by each player of said one or more players in a base game over a certain period of time.

8. The method of claim 1 wherein said first criterion comprises type of gaming machine played, wherein each of said one or more players of said group played the same type of gaming machine in a base game.

9. The method of claim 1 wherein said second criterion comprises amount of money played by a player of said group in said shared win game over a certain period of time.

10. A system for awarding a shared prize to players playing a shared win game using gaming machines, said system comprising:

one or more processors configured to:

assign one or more players to a group based on a first criterion;

establish a shared win award at least a component of which is divisible between one or more eligible players of said group, said shared win award having a fixed value determined prior to initiating the shared win game;

identify said eligible players to participate in winning a percentage of said component of said shared win award, wherein eligibility is based on a second criterion different than the first criterion; initiate the shared win game;

assign to each of said eligible players a sharing percentage as a function of each's rate of play during an eligibility period within said shared win game, wherein each's sharing percentage is subject to change during said eligibility period;

determine an occurrence of a shared win event, said occurrence of said shared win event fixing said each's sharing percentage; and award at least said component to said eligible players based upon each's sharing percentage.

11. The system of claim 10 wherein said rate of play is based upon number of games played.

12. The system of claim 10 wherein said rate of play is based upon amount of money wagered.

13. The system of claim 10 wherein said eligibility period is measured from the last shared win event to the next shared win event.

14. The system of claim 10 wherein said identifying said eligible players is determined based on player information data provided by one or more player cards and from configuration data received using a graphical user interface.

15. The system of claim 10 wherein said rate of play is based upon number of games played and amount of money wagered.

16. The system of claim 10 wherein said first criterion comprises an amount of money played by each player of said one or more players in a base game over a certain period of time.

17. The system of claim 10 wherein said first criterion comprises type of gaming machine played, wherein each of said one or more players of said group played the same type of gaming machine in a base game.

18. The system of claim 10 wherein said second criterion comprises amount of money played by a player of said group in said shared win game over a certain period of time.

19. A system for providing a shared win prize to eligible players playing a shared win game using gaming devices comprising:

a shared wins manager processor configured to set parameters for a shared win game event, wherein said shared wins manager processor is programmable to provide for the selection of eligible players entitled to share in a shared win prize, said shared win prize having a fixed value determined prior to initiating said shared win game;

one or more gaming devices, each of said one or more gaming devices comprising:

a display, an input area to receive a wager for the play of a base game, a device for identifying a player, and a communication interface, each of said one or more gaming devices displaying said base game for play by each of said eligible players; and a network to provide communication between each of said gaming devices and said shared wins manager processor, said communication interface providing player identification and wager information through said network to said shared wins manager processor, said shared wins manager processor configured to:

assign one or more players to a group based on a first criterion;

initiate said shared win game;

determine said selection of eligible players from said group and a respective win percentage of said shared win prize for each of said eligible players based on a second criterion different than the first criterion, said win percentage computed, using said fixed value, as a function of a rate of play during an eligibility time period within said shared win game for each of said eligible players, said rate of play based on rate of play information, and said shared wins manager processor configured to award to each of said eligible players their respective win percentage of said shared win prize upon occurrence of said shared win game event, wherein each respective win percentage is subject to change during said eligibility time period.

20. The system of claim 19 wherein said device comprises a card reader for reading a player card used to provide said player identification information.

21. The system of claim 19 wherein said device comprises a biometric device for providing said player identification information.

22. The system of claim 21 wherein said biometric device is used to check fingerprints.

23. The system of claim 21 wherein said biometric device is used to scan facial appearance.

24. The system of claim 21 wherein said biometric device is used to provide eye scans.

25. The system of claim 19 wherein said rate of play information comprises: number of games played; amount of money wagered, and wherein selection of said eligible players is based on whether said player inserts a player card into said device.

26. The system of claim 25 wherein said eligibility time period is measured from the last shared win event to the next shared win event.

27. The system of claim 19 wherein said network comprises an Ethernet network employing the TCP/IP protocol.

28. The system of claim 19 wherein said first criterion comprises an amount of money played by each player of said one or more players in a base game over a certain period of time.

29. The system of claim 19 wherein said first criterion comprises type of gaming machine played, wherein each of said one or more players of said group played the same type of gaming machine in a base game.

30. The system of claim 19 wherein said second criterion comprises amount of money played by a player of said group in said shared win game over a certain period of time.

* * * * *